US012404878B2

(12) United States Patent
Grün et al.

(10) Patent No.: US 12,404,878 B2
(45) Date of Patent: Sep. 2, 2025

(54) ACTUATING DEVICE FOR AT LEAST ONE FLUIDICALLY DRIVABLE CONSUMER

(71) Applicant: HYDAC Mobilhydraulik GmbH, Sulzbach/Saar (DE)

(72) Inventors: Stephan Grün, Heusweiler (DE); Michael Berwanger, Kleinblittersdorf (DE)

(73) Assignee: HYDAC MOBILHYDRAULIK GMBH, Sulzbach/Saar (DE)

( * ) Notice: Subject to any disclaimer, the term of this patent is extended or adjusted under 35 U.S.C. 154(b) by 0 days.

(21) Appl. No.: 18/690,460

(22) PCT Filed: Sep. 2, 2022

(86) PCT No.: PCT/EP2022/074444
§ 371 (c)(1),
(2) Date: Mar. 8, 2024

(87) PCT Pub. No.: WO2023/036701
PCT Pub. Date: Mar. 16, 2023

(65) Prior Publication Data
US 2024/0384732 A1 Nov. 21, 2024

(30) Foreign Application Priority Data
Sep. 11, 2021 (DE) ..................... 10 2021 004 608.0

(51) Int. Cl.
*F15B 1/02* (2006.01)
*E02F 9/22* (2006.01)
*F15B 1/033* (2006.01)

(52) U.S. Cl.
CPC ............ *F15B 1/021* (2013.01); *E02F 9/2207* (2013.01); *E02F 9/2228* (2013.01);
(Continued)

(58) Field of Classification Search
CPC ...................... F15B 1/021; F15B 1/033; F15B 2211/30515; F15B 2211/329;
(Continued)

(56) References Cited

U.S. PATENT DOCUMENTS 6,321,534 B1 * 11/2001 A'Hearn ............... E02F 9/2207 60/413
6,938,413 B2 * 9/2005 Harnischfeger ...... E02F 9/2207 60/413
(Continued)

FOREIGN PATENT DOCUMENTS

DE 10 2005 054394 5/2006 ................ E02F 9/22
DE 10 2012 208307 11/2013 ................ E02F 9/22
DE 2698545 * 2/2014 .............. F15B 1/021

OTHER PUBLICATIONS

Search report for International Application No. PCT/EP2022/074444, 5 pages, Nov. 30, 2022.

*Primary Examiner* — Dustin T Nguyen
(74) *Attorney, Agent, or Firm* — Slayden Grubert Beard PLLC

(57) ABSTRACT

The invention relates to an actuation device for at least one fluidically drivable load (10), such as a hydraulic actuator, consisting of at least one valve controller (V1) for controlling an alternating movement of each load (10) and at least one suspension device (14) which is connected between the valve controller (V1) and each load (10), wherein the suspension device (14) has an additional valve controller (V2), the valve piston (20) of which can be moved in a corresponding valve housing in a continuously adjustable manner. The invention is characterized in that a storage device (16) of the suspension device (14) is connected to the respective load (10) via a fluid path by means of the additional valve controller (V2) in a suspension position (V2.IV) of the valve piston (20) of the additional valve
(Continued)

controller (V2). The invention additionally relates to a method for actuating the respective load (10) using such an actuation device.

19 Claims, 4 Drawing Sheets

(52) U.S. Cl.
CPC ............ *E02F 9/2296* (2013.01); *F15B 1/033* (2013.01); *E02F 9/2217* (2013.01); *F15B 2211/30515* (2013.01); *F15B 2211/329* (2013.01); *F15B 2211/413* (2013.01); *F15B 2211/41581* (2013.01); *F15B 2211/428* (2013.01); *F15B 2211/625* (2013.01); *F15B 2211/6303* (2013.01); *F15B 2211/6306* (2013.01); *F15B 2211/6313* (2013.01); *F15B 2211/7053* (2013.01); *F15B 2211/8613* (2013.01)

(58) Field of Classification Search
CPC ...... F15B 2211/413; F15B 2211/41581; F15B 2211/428; F15B 2211/625; F15B 2211/6303; F15B 2211/6306; F15B 2211/6313; F15B 2211/7053; F15B 2211/8613; E02F 9/2207; E02F 9/2228; E02F 9/2296; E02F 9/2217
See application file for complete search history.

(56) References Cited

U.S. PATENT DOCUMENTS

| | | | | |
|---|---|---|---|---|
| 7,703,280 | B2 * | 4/2010 | Kobayashi | E02F 9/2207<br>60/469 |
| 9,879,404 | B2 * | 1/2018 | Schroeder | E02F 9/2217 |
| 9,932,721 | B2 * | 4/2018 | Vigholm | E02F 9/2207 |
| 10,247,206 | B2 * | 4/2019 | Shimada | F15B 13/0401 |
| 2004/0088972 | A1 * | 5/2004 | Harnischfeger | F15B 1/02<br>60/469 |
| 2006/0101815 | A1 | 5/2006 | Kobayashi | 60/413 |
| 2007/0056277 | A1 | 3/2007 | Mizoguchi | 60/413 |

* cited by examiner

ACTUATING DEVICE FOR AT LEAST ONE FLUIDICALLY DRIVABLE CONSUMER

CROSS-REFERENCE TO RELATED APPLICATIONS

This application claims priority to German Patent Application No. DE 10 2021 004 608.0, filed on Sep. 11, 2021 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to an actuating device for at least one fluidically drivable consumer, such as a hydraulic actuator, consisting of at least one valve control device for controlling an alternating movement of the respective consumer and at least one suspension device which is connected between the valve control device and the respective consumer, the suspension device having a further valve control device, the valve piston of which can be moved in a corresponding valve housing in a continuously adjustable manner.

DE 10 2014 000 696 A1 discloses a device for a consumer in the form of a hydraulically controllable actuator device. The device has a working hydraulic system as a control device via which hydraulic fluid can be admitted alternately to two working chambers of the actuator device. A valve device of the device, as part of a suspension device, is connected to the fluid path leading thereto, which valve device has a further control device in the form of a proportional control valve in addition to a switching valve and three logic elements.

By means of the valve device, the actuator device can be connected to an accumulator device as a further part of the suspension device, where beforehand, if the accumulator pressure of the accumulator device is higher than the working pressure in the actuator device, the accumulator pressure is relieved towards a tank via the control valve until the working pressure is reached. During operation of the device, the switching valve is used to establish or block a fluid connection for charging the accumulator device. A first logic element is used to compare the working pressure with the accumulator pressure for the purpose of activating a control line for activating a second and third logic element. The second logic element is used to establish or block a fluid connection between a working chamber of the actuator device and the accumulator device, and the third logic element is used to establish or block a fluid connection between the other working chamber of the actuator device and the tank. If the apparatus is working in a spring/damper mode in which the accumulator pressure is matched to the working pressure, the accumulator device is connected to the actuator device via a fluid path through the second logic element.

SUMMARY

A need exists to provide an actuating device for at least one fluidically drivable consumer which a simple design and improved operational reliability.

The need is addressed by an actuating device according to the independent claim(s). Embodiments of the invention are described in the dependent claims, the following description, and the drawings.

DESCRIPTION

Figure 1:
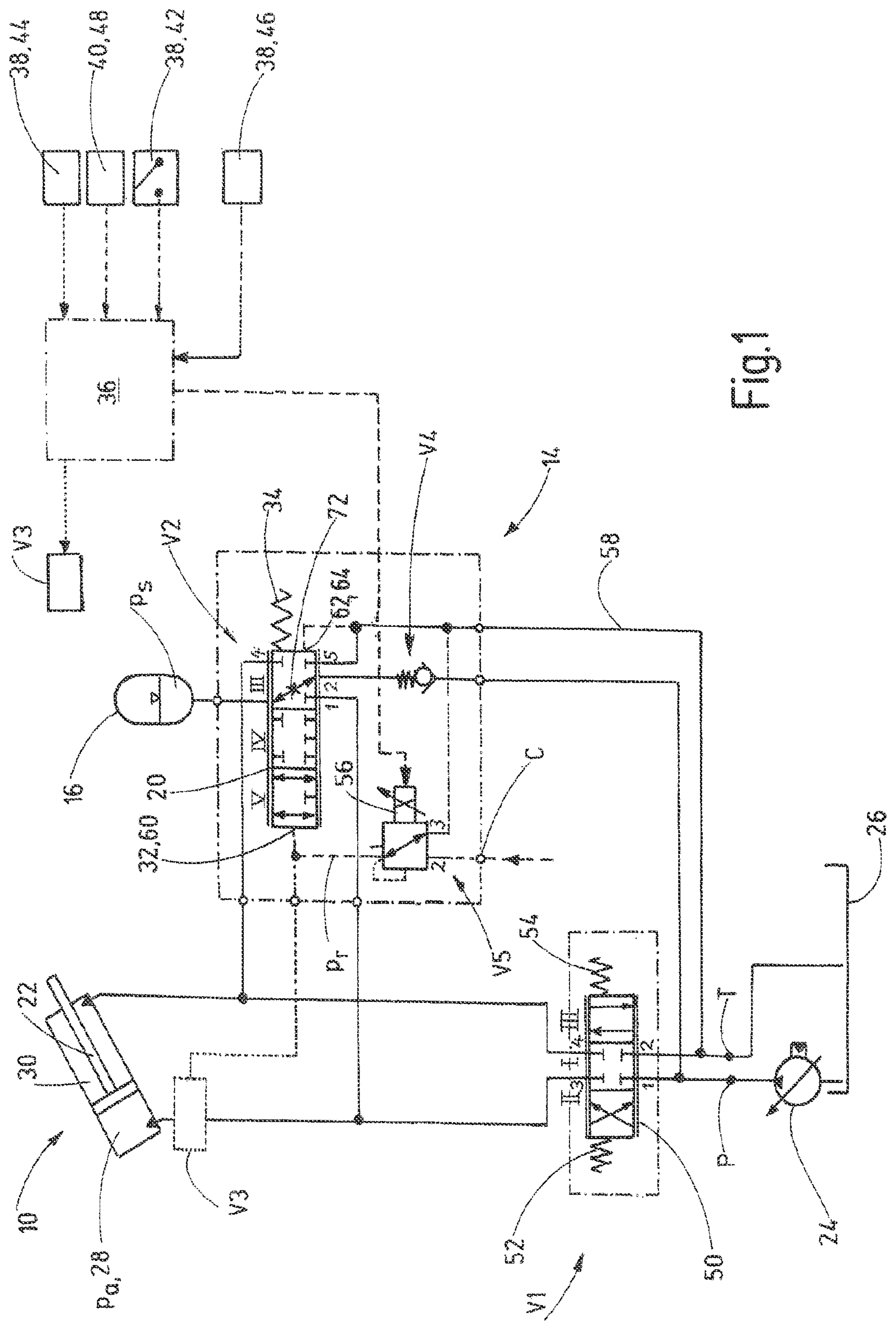
FIGS. 1 to 4 show a first to fourth embodiment of an actuating device, each in the manner of a fluid circuit diagram.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, the actuating device provides that, in a suspension position of the valve piston of the further valve controller, an accumulator device of the suspension device is connected to the respective consumer via a fluid path by means of the additional valve control device.

This means that the actuating device can be configured in a simple manner in terms of its construction. Thus, the logic elements and the switching and control valve provided in prior art according to DE 10 2014 000 696 A1 are obsolete or replaced by the suspension device, which is in its simplest embodiment only has one valve. Due to the reduced number of valves and thus also a reduced number of fluid lines and connections, leakage of the suspension device is reduced, which is beneficial for lifting unit suspension systems in which the actuating device is for example used, because leakage-induced lowering of the lifting unit is reduced during operation of the lifting unit suspension system. Consequently, the actuating device is more reliable in operation. Providing a smaller number of valves in the suspension device also improves the dynamics of the actuating device and reduces the cost of its production.

In some embodiments, it is provided that the actuating device is used for fluid pressure adjustment of the accumulator pressure of the accumulator device and the load-holding suspension pressure in the consumer. For example, it is provided that the valve control device, which is disposed in a main fluid branch, and the suspension device, which in contrast is disposed in a secondary fluid branch, are connected in parallel to each other and disposed between a pressure supply port and the consumer. In the present case, the consumer can be configured as an actuator, such as a fluidically drivable motor or a fluidically drivable working cylinder.

In some embodiments, it is provided that the further valve control device is configured in such a manner that, via the said valve control device, a suspension pressure in the consumer and an accumulator pressure of the accumulator device gradually balance each other out and accordingly adjust to each other when appropriately actuated. In this case, it is for example provided that the further valve control device is configured in such a manner that, when its valve piston moves into the suspension position, it establishes the fluid path at least partially in a gradually increasing manner, a suspension pressure in the consumer and an accumulator pressure of the accumulator device simultaneously balancing each other out via the fluid path and accordingly adjusting to each other in a gradually increasing manner. The accumulator device is switched on by establishing the fluid connection thereto and the suspension is thus activated. If different fluid pressures prevail in the consumer and the accumulator device, there will be a movement of the piston rod of the consumer after this fluid connection has initially been established, which, rather than being an abrupt movement, is controlled and takes place little by little as the fluid path is established in a gradually increasing and controlled manner. As a result, an operator of the actuating device has the option to intervene in the movement process of the piston rod and to influence it. In addition, if the actuating device is used for a consumer in the form of a working cylinder of a lifting unit suspension system of a mobile machine, the abrupt movement of the piston rod of the consumer, which can have an adverse effect on the driving stability of the machine and result in loss of and damage to the load lifted by the lifting unit, is prevented when the suspension is activated.

In some embodiments, it is provided that the valve piston disconnects a pressure supply port of the actuating device and the accumulator device from each other as the fluid path is established in a gradually increasing manner and/or when it is disposed in the suspension position. This prevents a displacement movement of the piston rod of the consumer when the suspension is activated due to a fluid pressure at the pressure supply port which differs from the load-holding suspension pressure in the consumer.

In some embodiments, it is provided that an actuating device for the valve piston of the further valve control device is provided to actuate the further valve control device, by means of which a force can be applied to a control side of the valve piston of the further valve control device. The actuating device is for example configured as a proportional pressure-reducing valve, via which a control fluid pressure can be applied to a control side of the valve piston of the further valve control device. In this case, it is for example provided that the proportional pressure-reducing valve can be electromagnetically actuated against the force of the control fluid pressure. Alternatively, an electromotive actuator can be provided to actuate the valve piston of the further valve control device, which actuator acts on the one control side of the valve piston of the further valve control device. As a result, only one electrical control line is to be provided in each case to actuate the suspension device, in particular to actuate the further valve control device.

In some embodiments, it is provided that a control device and, connected thereto, at least one input device and for example at least one sensor device for detecting status values are provided and that the proportional pressure-reducing valve or the actuator can be controlled by the control unit.

In some embodiments, it is provided that the valve piston of the further valve control device can be disposed in a charging position in which, for charging it, the accumulator device is connected to the pressure supply port by the further valve control device via a further fluid path and, for example, that the consumer is connected to this pressure supply port via the respective one valve control device. This allows the accumulator device to be charged to extend or retract the piston rod of the consumer with each control command which increases the pump pressure. For example, it is provided in this case that a restrictor or throttle, which is in particular adjustable, for example proportionally adjustable, is connected in the further fluid path.

In some embodiments, it is provided that the valve piston of the further valve control device can be disposed in a discharging position in which the accumulator device is connected to the tank port by the further valve control device via a further fluid path. As a result, the accumulator device can be emptied towards the tank so that no fluid pressure or energy is retained in the accumulator device when the actuating device is in a non-operating state. For example, it is provided that a throttle or diaphragm is disposed in this fluid path.

In some embodiments, it is provided that the valve piston of the further valve control device can be disposed in at least one disconnecting position in which said valve piston disconnects all ports of the further valve control device from one another, and that a disconnecting position between the suspension position and the charging position is provided and/or that a further disconnecting position between the charging position and the discharging position is provided. The disconnecting positions form standby positions in which the valve piston can be disposed when a previous process step of the actuating device has been completed and the actuating device is ready for a subsequent process step. This improves the response behaviour of the actuating device.

In some embodiments, it is provided that, in the suspension position of the further valve control device, the consumer is connected, in particular via the further valve control device, to a tank port. Alternatively, a discharge valve can be provided in a fluid connection between the consumer and the tank port and, to actuate the discharge valve, the control fluid pressure acts on a control side of its valve piston.

In some embodiments, it is provided that, in the fluid connection between the consumer and the further valve control device and/or between the latter and the accumulator device, in each case a pressure sensor detects the load-holding suspension pressure or the accumulator pressure respectively, which pressure sensor is connected to the control unit of the actuating device for transmitting its pressure measurement values. As a result, even before the connection between the accumulator device and the consumer is established, the accumulator pressure of the accumulator device can automatically be actively adjusted to the load-holding suspension pressure of the consumer by means of the control unit, whereby a movement of the piston rod of the consumer is minimised or even prevented when the suspension is activated. In addition, the filling speed of the accumulator device can be adjusted based on the measured values of the pressure sensor assigned to the accumulator device.

In some embodiments, it is provided that a load-holding valve is provided in a line connected to the consumer, which valve can be controlled by the proportional valve by means of the control fluid pressure or via an additional port of the actuating device or by the control unit. If the load-holding valve is activated by means of the control fluid pressure, separate actuation of the load-holding valve is superfluous, so that components necessary for such separate actuation need not be provided. If the load-holding valve is activated by the control unit, this can take place directly or indirectly via a pilot valve.

In some embodiments, it is provided that a pressure supply source, which can be connected to the pressure supply port, can be actuated by a load-sensing signal dependent on the accumulator pressure. As a result, the pump pressure can be adjusted during a charging process of the accumulator device depending on the fluid pressure in the accumulator device.

In some embodiments, it is provided that the further valve control device is configured as a 3/3 or 5/3 or 6/5 proportional directional-control valve in spool design.

In some embodiments, it is provided that the fluid used is hydraulic fluid, in particular hydraulic oil, so that all fluidic components of the actuating device are hydraulic components.

In some embodiments, it is provided that a further pressure-reducing valve or an unloading valve is provided in the fluid connection between the pressure supply port and the further valve control device to limit the system pressure and/or a pressure-limiting valve is provided between the valve control device and the accumulator device to limit the accumulator pressure.

In some embodiments, a mobile machine, in particular a construction machine, such as a wheel loader or mobile excavator, is provided with a lifting unit having the at least one consumer, and the aforementioned actuating device, by means of which the respective consumer can be actuated.

The teachings herein further relate to a method for actuating at least the one fluidically drivable consumer by means of an aforementioned actuating device, comprising the following method steps: Charging the accumulator device to an initial accumulator pressure via the further valve control device disposed in its charging position; and moving the valve piston of the further valve control device into its suspension position, the valve piston establishing the fluid path between the accumulator device and the consumer at least partially in a gradually increasing manner, a suspension pressure in the consumer and a current accumulator pressure of the accumulator device simultaneously balancing each other out via the fluid path and accordingly adjusting to each other in a gradually increasing manner. Actively charging the accumulator device to an initial accumulator pressure ensures that the accumulator device is charged at all times and is therefore ready for its suspension function.

In some embodiments, it is provided that the initial accumulator pressure corresponds to the maximum operating pressure of the actuating device and that adjustment of the initial accumulator pressure is carried out by discharging the accumulator device. This ensures that activation of the suspension results at the most in a controlled and gradual extension movement of the piston rod of the consumer which is less critical to safety than a retraction movement. Furthermore, the fact that the accumulator device is only charged once in each case to the maximum operating pressure before the suspension is activated, particularly in contrast to continuous adjustment of the accumulator pressure, increases the energy efficiency and service life of the accumulator device and improves the response times and response behaviour of the machine.

In some embodiments, it is provided that the suspension pressure and the accumulator pressure are each detected by means of a pressure sensor and that, after the accumulator device has been charged and before it is connected to the consumer, the initial accumulator pressure is adjusted to the suspension pressure, which then corresponds to the current accumulator pressure, as a function of these detected pressures by either discharging or charging the accumulator device. As a result, when the suspension is activated, a movement of the piston rod of the consumer is minimised or even prevented.

In some embodiments, it is provided that a damping rate can be adjusted by disposing the valve piston of the further valve control device in an intermediate position between the suspension position and the adjacent disconnecting position.

An actuating device according to the teachings herein is explained in greater detail below with reference to the drawing. The drawings show in principle and not to scale.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS.

The FIGS. show an actuating device for a fluidically drivable consumer 10 in the form of an actuator 10. The actuating device has a valve control device V1 for controlling an alternating movement of the actuator 10, and a suspension device 14 which is connected between the valve control device V1 and the actuator 10. The suspension device 14 has an accumulator device 16 and a further valve control device V2, the valve piston 20 of which can be moved in its valve housing in a continuously adjustable manner. The valve piston 20 of the further valve control device V2 can be disposed in a suspension position V2.V, in which it connects the accumulator device 16 to the actuator 10 via a fluid path through the further valve control device V2.

The actuating device is used for fluid pressure adjustment of the accumulator pressure $p_s$ of the accumulator device 16 and the load-holding suspension pressure $p_a$ in the actuator 10 for the purpose of subsequent, in particular damped, suspension of a piston rod unit 22 of the actuator 10 using the accumulator pressure $p_s$ of the accumulator device 16.

The actuating device comprises a pressure supply source 24 which is connected with its intake side to a fluid storage tank 26 and with its high-pressure side via a fluid line to a piston-side working chamber 28 of the actuator 10. A rod-side working chamber 30 of the actuator 10 is connected via a further fluid line to the tank 26. The valve control device V1 is connected as the main control valve into the two fluid lines, which form a kind of main fluid branch. Depending on the switching position of the valve V1, the high-pressure side can also be the rod side. Parallel to the valve control device V1, the suspension device 14 is connected to these two fluid lines in a kind of secondary fluid branch and can be switched on selectively.

A first port V2.1 of the further valve control device V2 of the suspension device 14 is connected via a fluid line to a branching point in the fluid line between the valve control device V1 and the piston-side working chamber 28 of the actuator 10. A second port V2.2 of the further valve control device V2 is connected via a further fluid line to a branching point in the fluid line between the valve control device V1 and a pressure supply port P of the actuating device, to which the pressure supply source 24 is connected on the high-pressure side. A third port V2.3 of the further valve control device V2 is connected to a fluid side of the accumulator device 16.

The further valve control device V2 is configured as a proportional valve. An end position V2.V of the valve piston 20 of the further valve control device V2 corresponds to its suspension position V2.V, in which this valve piston 20 connects the first V2.1 and the third V2.3 port of the further valve control device V2 to each other and disconnects the second port V2.2 from all other ports of the further valve control device V2 and connects the rod side (V2.4) to the tank (V2.5). To actuate the valve piston 20, its one control side 32 can be acted upon by an actuating device V5, 32, against the force of a compression spring 34, by means of a force towards the one end position V2.V in the form of the suspension position V2.V.

The further valve control device V2 is configured in such a manner that, when its valve piston 20 moves into the suspension position V2.V, it establishes the fluid path between the piston-side working chamber 28 of the actuator 10 and the accumulator device 16 in a gradually increasing manner, i.e. little by little, a load-holding suspension pressure $p_a$ in the piston-side working chamber 28 of the actuator 10 and an accumulator pressure $p_s$ of the accumulator device 16 balancing each other out via the fluid path and accordingly adjusting to each other in a gradually increasing manner. The corresponding pressure adjustment is considered to be a passive pressure adjustment. During the gradually increasing establishment of this fluid path and when the valve piston 20 is disposed in the suspension position V2. V, the rod-side working chamber 30 of the actuator 10 is relieved towards the tank 26. A gradual pressure relief of the rod-side chamber 30 also takes place.

Furthermore, the valve piston 20 of the further valve control device V2 can be disposed in a charging position V2.III, in which this valve piston 20 disconnects the first port V2.1 of the further valve control device V2 from all its other ports and connects its second V2.2 and third V2.3 ports to each other via a fluid path. A throttle 72 or restrictor can be connected in this fluid path. Between its suspension position V2.V and charging position V2.III, the valve piston 20 of the further valve control device V2 can be disposed in a disconnecting position V2.IV, in which said valve control device disconnects all ports of the further valve control device V2 from one another.

A controllable load-holding valve V3 is connected in the fluid path between the valve control device V1 and the piston-side working chamber 28 of the actuator 10. In this case, load-holding valves is the generic term for pipe break protection valves or lowering brake valves.

The actuating device also has a control unit 36. At least one input device 38 and at least one sensor device 40 for detecting status values are connected to the control unit 36. An operator of the actuating device can selectively activate or deactivate the suspension via an input device 38, 42 and enter control commands for the actuator 10 via this or a further input device 38, 44 and enter a damping rate of the suspension via this or a further input device 38, 46. A motion sensor 48 is provided as sensor device 40, in particular for detecting speed values.

A check valve V4, which opens towards the further valve control device V2 against the force of a compression spring, is connected in the fluid line between the branching point, which is provided in the fluid line between the pressure supply port P and the valve control device V1, and the second port V2.2 of the further valve control device V2. The check valve V4 prevents the accumulator device 16 from emptying if the valve piston 20 of the further valve control device V2 is disposed in the charging position V2.III and the pressure of the pressure supply source 24 is lower than the accumulator pressure $p_s$.

A first port V1.1 of the valve control device V1 is fluidically connected to the pressure supply port P via a fluid line and a second port V1.2 is fluidically connected to the tank port T via a further fluid line. A third port V1.3 of the valve control device V1 is connected via a further fluid line to the piston-side working chamber 28 of the actuator 10 and a fourth port V1.4 is connected via a further fluid line to the rod-side working chamber 30 of the actuator 10. Starting in each case from its unactuated first position V1.I shown in the Figures, a valve piston 50 of the valve control device V1, which is configured as 4/3 proportional directional-control valve V1, can be moved into its second position V1.II against the force of a compression spring 54 and into its third position V1.III against the force of a further compression spring 52. The second V1.II and the third V1.III position correspond to the two end positions V1.II, V1.III of the valve piston 50. In the first position V1.I, the unactuated valve piston 50 is held by the two compression springs 52, 54 and disconnects all ports of the valve control device V1 from one another. Disposed in the second position V1.II, the valve piston 50 of the valve control device V1 connects its first V1.1 and its fourth V1.4 port to each other and its third V1.3 and its second V1.2 port to each other. Disposed in the third position V1.III, the valve piston 50 of the valve control device V1 connects its first V1.1 and its third V1.3 port to each other and its fourth V1.4 and its second V1.2 port to each other.

Figure 2:
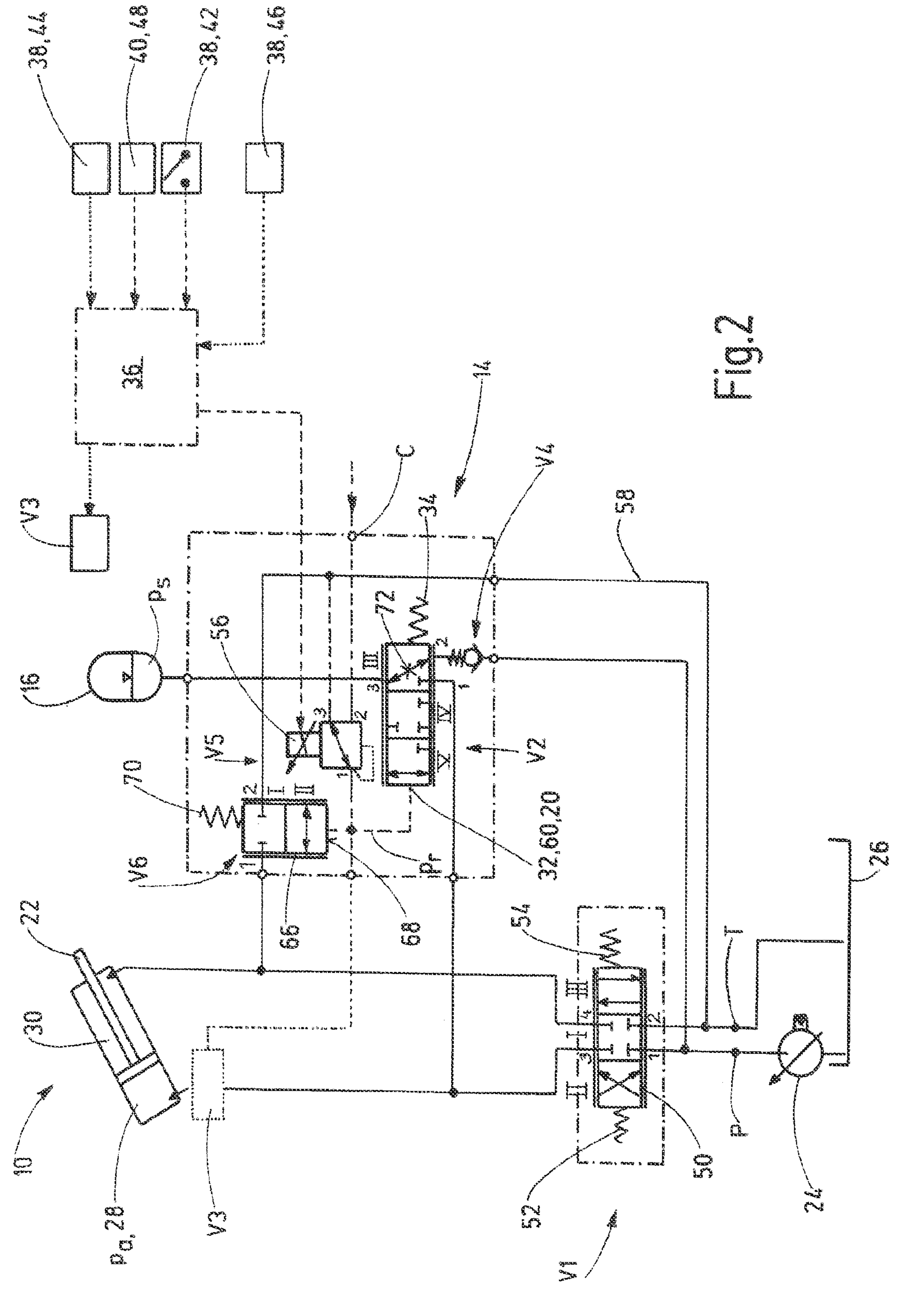
Figure 3:
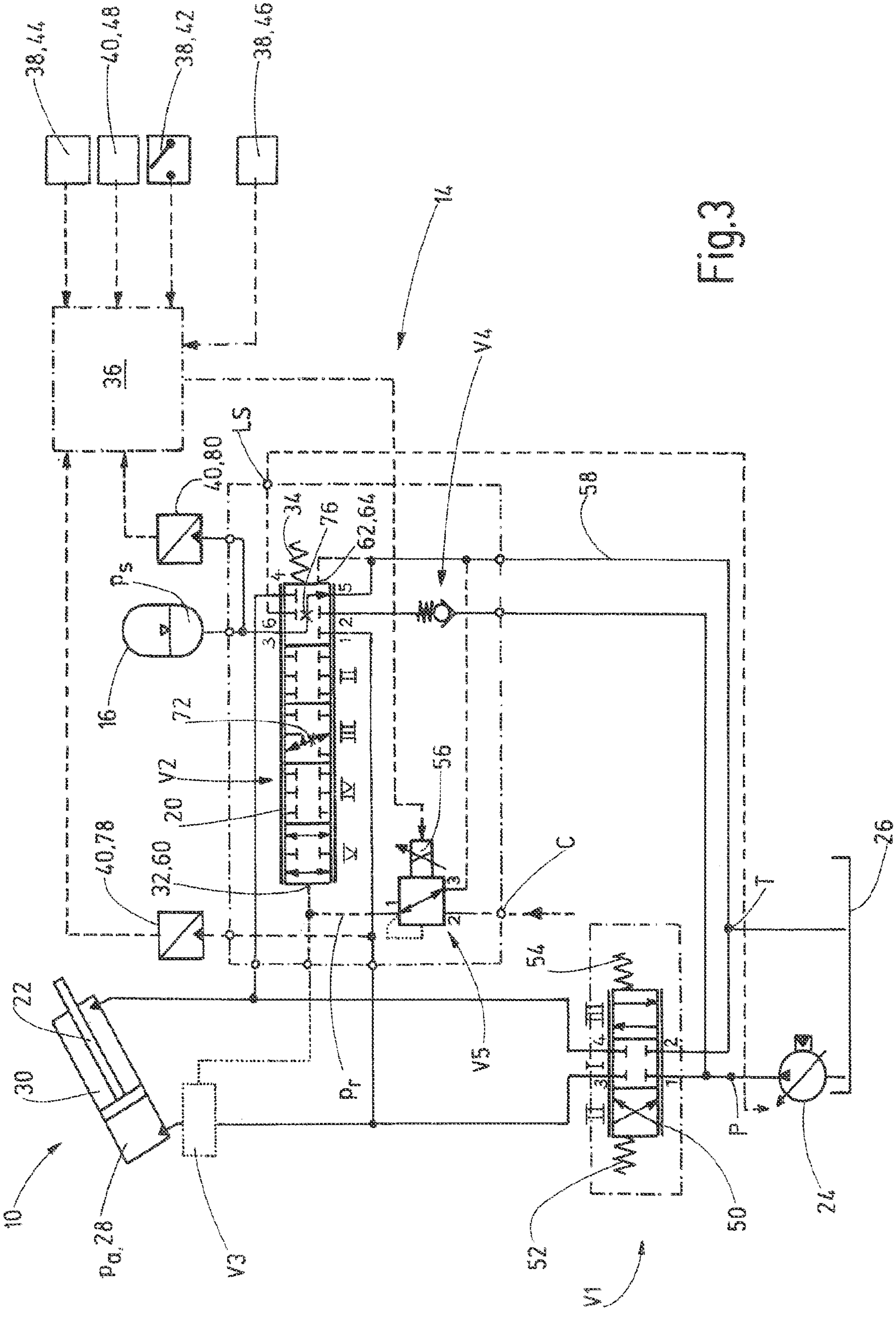

In the first to third embodiment according to FIGS. 1 to 3, to actuate the valve piston 20 of the further valve control device V2 against the force of the compression spring 34, the one control side 32 of the valve piston 20 can be acted upon by means of a control fluid pressure $p_r$ towards the one end position V2.V in the form of the suspension position V2.V. To control the control fluid pressure $p_r$, a proportional pressure-reducing valve V5 is provided, the valve piston of which can be electromagnetically actuated against the force of the control fluid pressure $p_r$. For this purpose, the control unit 36 controls a solenoid actuating device 56 of the proportional pressure-reducing valve V5.

The control fluid pressure $p_r$ is tapped at a first port V5.1 of the proportional pressure-reducing valve and routed via a control line to a control side of the valve piston of the proportional pressure reducing valve V5. A second port V5.2 of the proportional pressure-reducing valve V5 is connected to a pilot fluid pressure port C of the actuating device and a third port V5.3 is connected to a tank line 58. Optionally, it is possible to supply the proportional pressure-reducing valve from the pressure supply port P.

In addition, the control fluid pressure $p_r$ is routed to the one control side 32 of the valve piston 20 of the further valve control device V2 via a further control line and a control port 60. To actuate the load-holding valve V3, the control fluid pressure $p_r$ is tapped at a branching point in the control line between the proportional pressure-reducing valve V5 and the further valve control device V2 and routed to the load-holding valve V3 via a further control line.

In the first embodiment according to FIG. 1, the further valve control device V2 is configured as a 5/3 directional-control valve. The fluid path from the rod-side working chamber 30 of the actuator 10 to the tank 26 is routed via the further valve control device V2. For this purpose, a fourth port V2.4 of the further valve control device V2 is connected via a fluid line to a branching point in the fluid line between the rod-side working chamber 30 of the actuator 10 and the valve control device V1. A fifth port V2.5 of the further valve control device V2 is connected to the tank line 58 via a fluid line. In the suspension position V2.V, the fourth V2.4 port is connected to the fifth V2.5 port, which are each disconnected from all other ports of the further valve control device V2 in the charging position V2.III and disconnecting position V2.IV. A control pressure is tapped in the tank line 58 and routed via a control line and another control port 62 to another control side 64 of the valve piston 20 of the further valve control device V2.

In the second embodiment according to FIG. 2, the further valve control device V2 is configured as a 3/3 directional-control valve. The fluid path from the rod-side working chamber 30 of the actuator 10 to the tank 26 is routed via a discharge valve V6, which is configured as a 2/2 proportional directional-control valve V6. In an unactuated first end position V6.I shown in FIG. 2, a valve piston 66 of the discharge valve V6 disconnects its two ports V6.1, V6.2 from each other, whereas these ports V6.1, V6.2 are connected to each other in its second end position V6.II. To actuate the discharge valve V6, the control fluid pressure $p_r$, which is tapped at the branching point in the control line between the proportional pressure-limiting valve V5 and the further valve control device V2, acts on a control side 68 of its valve piston 66. By means of the control fluid pressure $p_r$, the valve piston 66 of the discharge valve V6 can be brought from its first V6.I into its second V6.II end position against the force of a compression spring 70.

In the first and second embodiment, the charging position V2.III of the valve piston 20 of the further valve control device V2 corresponds to its unactuated, other end position V2.III. In addition, in these two embodiments, the accumulator device 16 can be connected to the tank 26 via a shut-off valve, and in particular via a throttle or restrictor, to release the accumulator pressure $p_s$ or accumulator fluid.

In the third embodiment according to FIG. 3, the further valve control device V2 is configured as a 6/5 directional-control valve. The fluid path from the rod-side working chamber 30 of the actuator 10 to the tank 26 is routed via the further valve control device V2. The further valve control device V2 has a fourth V2.4 and a fifth V2.5 port as well as another control port 62 which, corresponding to the first embodiment according to FIG. 1, are connected to components of the actuating device and are connected to each other or disconnected from each other in the suspension position V2.V and disconnecting position V2.IV of the valve piston 20. In addition, the further valve control device V2 is provided with a sixth port V2.6, which is connected via a load-signalling or load-sensing port LS and a corresponding line to the pressure supply source 24 in the form of an adjustable pump 24 for the purpose of setting the pressure thereof. The LS signal could also be transmitted to the pumps via pressure transducers (at port LS) or electronically. This would eliminate the hose line of the pump. The pump 24 is connected in turn on the high-pressure side to the pressure supply port P of the actuating device. When the valve piston 20 of the further valve control device V2 is disposed in its charging position V2.III, its second V2.2 and its third V2.3 ports are connected to each other via a fluid path, in which a branching point is provided to which its sixth port V2.6 is connected. The throttle 72 or restrictor can be connected in the fluid path between the second port V2.2 of the further valve control device V2 and this branching point.

In the third embodiment, the valve piston 20 of the further valve control device V2 can also be disposed in a discharging position V2.I, in which its third V2.3 and fifth V2.5 ports are connected to each other via a fluid path and its remaining ports are disconnected from one another. A throttle 76 of restrictor can be connected in this fluid path. Between its discharging position V2.I and charging position V2.III, the valve piston 20 of the further valve control device V2 can be disposed in a further disconnecting position V2.II, in which said valve control device disconnects all ports of the further valve control device V2 from one another. In addition, to detect the respective fluid pressure $p_a$,$p_s$ in the fluid line between the piston-side working chamber 28 of the actuator 10 and the further valve control device V2 as well as in the fluid line between this V2 and the accumulator device 16, a pressure sensor 40, 78, 80 is provided in each case, which is connected to the control unit 36 to transmit its measured values.

By using the pressure sensor 80 to monitor the accumulator pressure $p_s$, it is possible to dispense with an additional pressure-limiting valve to safeguard the maximum accumulator pressure, particularly after a safety assessment.

In the first to third embodiment, when the suspension is activated, proportional control grooves of the respective valve piston 20 of the further valve control device V2 and/or of the proportional pressure-reducing valve V5 in particular ensure a gradual displacement movement of the piston rod 22 of the actuator 10. Instead of actuating the valve piston 20 of the further valve control device V2 by means of the proportional pressure-reducing valve V5, this actuation can also be carried out by means of an electromotive actuator 82 according to the fourth embodiment.

Figure 4:
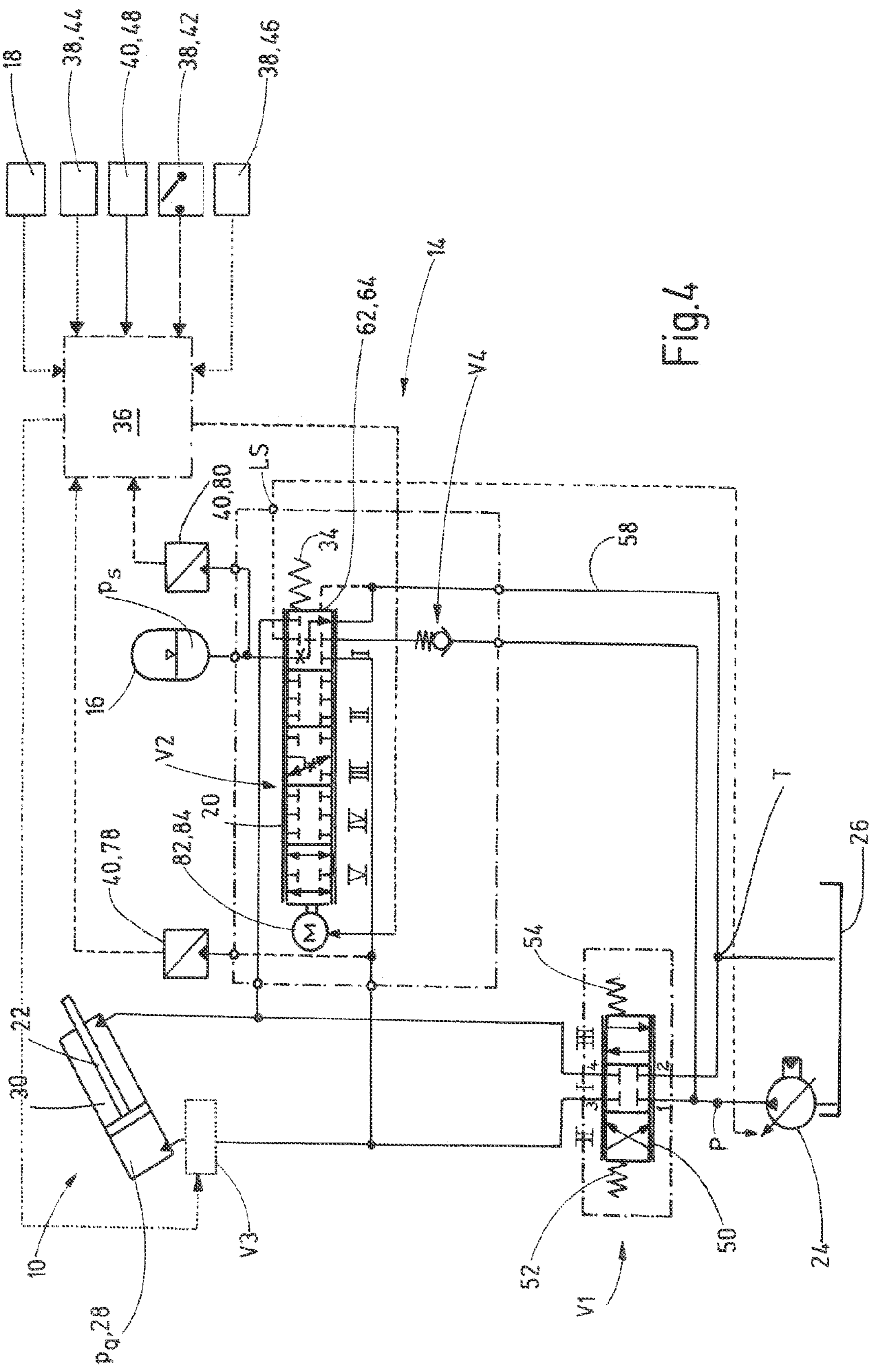

In the fourth embodiment according to FIG. 4, the further valve control device V2 is configured and connected according to the further valve control device V2 of the third embodiment. Pressure sensors 40, 78, 80 corresponding to the third embodiment and connected accordingly are also provided. In contrast to the third embodiment, in the fourth embodiment the electromotive actuator 82 is provided for actuating the valve piston 20 of the further valve control device V2, the electric motor 84 of which can be controlled by the control unit 36 via an electric line. Furthermore, the load-holding valve V3 is activated directly by the control unit 36.

In the third and fourth embodiment, the discharging position V2.I of the valve piston 20 of the further valve control device V2 corresponds to its unactuated, other end position V2.I. The charging position V2.III is provided between the discharging position V2.I and the suspension position V2.V.

The actuator 10 is configured as a working cylinder 10. The actuating device is part of a mobile machine, not shown in the Figures, in particular a construction machine, such as a wheel loader or a mobile excavator, with a lifting unit having the working cylinder 10. Lifting unit suspension systems, which comprise the actuating device and a lifting unit, are used for increasing the comfort and driving safety of the machine.

The control unit 36 for controlling the further valve control device V2 can correspond to the control unit 36 of the machine. Alternatively, for controlling the further valve control device V2, the control unit 36 can form a unit with said further valve control device V2, which unit is separated from the control unit of the machine spatially and in terms of hardware. The latter variant has the benefit that fewer control signals are necessary for communication between the control unit 36 of the further valve control device V2 and the control unit of the machine. As a result, the control unit of the machine can be more simply configured to the effect that no inputs and outputs need to be provided for the suspension function.

The valve control device V1 can be provided in a main control block and the suspension device 14, in particular the further valve control device V2, as a mounted disc for the main control block. Alternatively, the valve control device V1 and the suspension device 14 can be constructed in a monobloc design.

The valve control device V1 and the further valve control device V2 can be actuated independently of each other, in particular by the control unit 36, and their valve pistons 20, 50 can accordingly be moved independently of each other.

The actuating device according to the first and second embodiment is operated as follows:

Charging process step: the accumulator device 16 is charged to an initial accumulator pressure via its further valve control device V2 disposed in its charging position V2.III. The initial accumulator pressure can correspond to the maximum operating pressure of the actuating device which corresponds to the maximum operating pressure of the lifting unit. Since the further valve control device V2 is connected to the pressure supply port P to supply the actuator 10, the accumulator can be charged passively each time the pump pressure is increased to control the actuator 10. However, the accumulator device 16 is for example charged actively, independently of the actuator 10 being controlled.

This can be followed by a disconnecting process step: After charging the accumulator device 16, the valve piston 20 of the further valve control device V2 can be moved into the disconnecting position V2.IV, which is provided between the charging position V2.III and the suspension position V2.V.

This is followed by a testing process step: For example, at least one of the following conditions must be met for the suspension to be activated by the control unit 36: The suspension is activated, in particular permanently, via the corresponding input device 38, 42; the suspension is not permanently deactivated via the input device 38, 42; the machine exceeds a certain driving speed which is detected by the speed sensor 40, 48. The control unit 36 can verify the activation of the suspension based on control commands for the actuator 10 which are fed to it by the corresponding input device 38, 44. It can be provided here that the suspension is only activated if the actuator 10 is not controlled by an operator via the input device 38, 44.

This is followed by the process step of passive pressure adjustment: If the predefinable conditions are met, the load-holding valve V3 is opened to activate the suspension if it is in its closed position. In addition, the valve piston 20 of the further valve control device V2 is moved into its suspension position V2.V, in particular starting from its disconnecting position V2.IV. In this case, the valve piston 20 establishes the fluid path between the accumulator device 16 and the piston-side working chamber 28 of the actuator 10 in a gradually increasing manner, a suspension pressure $p_a$ in this working chamber 28 and d a current accumulator pressure $p_s$ of the accumulator device 16 balancing each other out via the fluid path and accordingly adjusting to each other in a gradually increasing manner. At the same time, the rod-side working chamber 30 of the actuator 10 is connected to the tank 26.

The actuating device according to the third and fourth embodiment is operated as follows:

In a deactivated state of the actuating device, for example when the machine is switched off, the valve piston 20 of the further valve control device V2 is disposed in its unactuated discharging position V2.I, whereby the accumulator device 16 is relieved towards the tank 26.

When the actuating device is subsequently activated, for example when the machine is switched on, the valve piston 20 can first be moved starting from the discharging position V2.I into a further disconnecting position V2.II which is provided between the discharging position V2.I and the charging position V2.III. This is followed by a charging process step according to the first and second embodiment, whereby the accumulator pressure $p_s$ can be monitored by means of the associated pressure sensor 80 and/or fed to the pump 24 via the load-sensing line. Charging of the accumulator device 16 can be coordinated with the current degree of utilisation 18 of the machine drive unit to the effect that the accumulator device 16 is only charged if the drive unit is not currently fully utilised or sufficient power reserves are available. For this purpose, the degree of utilisation 18 of the unit is detected and fed to the control unit 36. The unit can be designed as an internal combustion engine or electric motor. Depending on the accumulator pressure 16 and the degree of utilisation 18 of the drive unit, a filling speed of the accumulator device 16 can be predefined, in particular adjusted proportionally.

The valve piston 20 can then be moved back into the disconnecting position V2.II provided between the discharging position V2.I and the charging position V2.III.

When the suspension is activated, the testing process step according to the first and second embodiment and then active pressure adjustment of the accumulator pressure $p_s$ to the load-holding suspension pressure $p_a$ is carried out in the piston-side working chamber 28 of the actuator 10. For this purpose, based on the measured values of the two pressure sensors 40, 78, 80 by the control unit 36, a differential pressure is determined between the accumulator pressure $p_s$ and the suspension pressure $p_a$, based on which the accumulator pressure $p_s$ of the accumulator device 16 is actively adjusted to the suspension pressure $p_a$. Thus, if the accumulator pressure $p_s$ is higher than the suspension pressure $p_a$ when the suspension is activated, the valve piston 20 is moved into its discharging position V2.I and the accumulator device 16 is relieved towards the tank 26 until the accumulator pressure $p_s$ is brought in line with the suspension pressure $p_a$. If, on the other hand, the suspension pressure $p_a$ is higher than the accumulator pressure $p_s$ when the suspension is activated, the valve piston 20 is moved into its charging position V2.III and the accumulator device 16 is charged until the accumulator pressure $p_s$ is brought in line with the suspension pressure $p_a$. This is considered to be active pressure adjustment. If the active pressure adjustment is carried out after the suspension has been activated due to the machine reaching a certain travel speed and the machine is currently being accelerated at almost full capacity of its drive unit, it is beneficial if the accumulator device 16 has initially been charged to the maximum operating pressure, because for active pressure adjustment only fluid pressure $p_s$ needs to be released from the accumulator device 16 towards the tank 26, which requires no power from the drive unit.

This is followed by the process step of passive pressure adjustment and if necessary the disconnecting process step according to the first and second embodiment.

In each embodiment, as the valve piston 20 moves along its travel path, it assumes various intermediate positions, which correspond to various damping rates of the suspension, starting from the disconnecting position V2.IV between suspension position V2.V and charging position V2.III, towards its suspension position V2.V. In this case, damping of the suspension is at its highest when the fluid connection between the accumulator device 16 and the actuator 10 is initially established and then decreases during the travel movement of the valve piston 20 towards its suspension position V2.V. When the valve piston 20 has finally reached its suspension position V2.V, free suspension is enabled, i.e. the fluid path between the accumulator device 16 and the actuator 10 is substantially free of flow cross-section constriction devices. Therefore, the damping rate of the suspension can be predefined via the corresponding input device 38, 46 by means of a specific arrangement of the valve piston 20 in an intermediate position between the said disconnecting position V2.IV and the suspension position V2.V.

In the first to third embodiment, the valve piston 20 of the further valve control device V2 is actuated starting from the control unit 36 via the proportional pressure-limiting valve V5 and in the fourth embodiment starting from the control unit 36 via the electromotive actuator 82.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. An actuating device for at least one fluidically drivable consumer, comprising at least one valve device for controlling an alternating movement of a respective consumer and at least one suspension device which is connected between the at least one valve device and the respective consumer, wherein the suspension device has a further valve device, the valve piston of which can be moved in an associated valve housing in a continuously adjustable manner; wherein, in a suspension position of the valve piston of the further valve device, an accumulator device of the suspension device is connected to the respective consumer via a fluid path by means of the further valve device;

the valve piston of the further valve device can be disposed in a charging position in which, for charging it, the accumulator device is connected to the pressure supply port by the further valve device via a further fluid path;

the valve piston of the further valve device can be disposed in at least one disconnecting position in which said valve piston disconnects all ports of the further valve device from one another; and wherein a disconnecting position between the suspension position and the charging position is provided.

2. The actuating device of claim 1, wherein the further valve device is configured in such a manner that, via the said device, a suspension pressure in the consumer and an accumulator pressure of the accumulator device gradually balance each other out and accordingly adjust to each other when actuated.

3. The actuating device of claim 2, wherein the further valve device is configured in such a manner that, when its valve piston moves into the suspension position, it establishes the fluid path at least partially in a gradually increasing manner, wherein a suspension pressure in the consumer and the accumulator pressure of the accumulator device simultaneously balancing each other out via the fluid path and accordingly adjusting to each other in a gradually increasing manner.

4. The actuating device of claim 2, wherein the valve piston disconnects a pressure supply port of the actuating device and the accumulator device as the fluid path is established in a gradually increasing manner and/or when it is disposed in the suspension position.

5. The actuating device of claim 2, wherein, to actuate the further valve device, a proportional pressure-reducing valve is provided via which a control fluid pressure can be applied to a control side of the valve piston of the further valve-control device.

6. The actuating device of claim 1, wherein the further valve device is configured in such a manner that, when its valve piston moves into the suspension position, it establishes the fluid path at least partially in a gradually increasing manner, wherein a suspension pressure in the consumer and an accumulator pressure of the accumulator device simultaneously balancing each other out via the fluid path and accordingly adjusting to each other in a gradually increasing manner.

7. The actuating device of claim 6, wherein the valve piston disconnects a pressure supply port of the actuating device and the accumulator device as the fluid path is established in a gradually increasing manner and/or when it is disposed in the suspension position.

8. The actuating device of claim 6, wherein, to actuate the further valve device, a proportional pressure-reducing valve is provided via which a control fluid pressure can be applied to a control side of the valve piston of the further valve-control device.

9. The actuating device of claim 1, wherein the valve piston disconnects a pressure supply port of the actuating device and the accumulator device as the fluid path is established in a gradually increasing manner and/or when it is disposed in the suspension position.

10. The actuating device of claim 1, wherein, to actuate the further valve device, a proportional pressure-reducing valve is provided via which a control fluid pressure can be applied to a control side of the valve piston of the further valve device.

11. The actuating device of claim 10, wherein the proportional pressure-reducing valve can be electromagnetically actuated against the force of the control fluid pressure.

12. The actuating device of claim 1, wherein a further disconnecting position between the charging position and a discharging position of the valve piston of the further valve device is provided in which the accumulator device is connected to a tank port via the further valve device.

13. The actuating device of claim 1, wherein a discharge valve is provided in a fluid connection between the consumer and a tank port and wherein, to actuate the discharge valve, a control fluid pressure acts on a control side of its valve piston.

14. The actuating device of claim 1, wherein a pressure sensor, which detects a suspension pressure of the consumer, and/or a further pressure sensor, which detects an accumulator pressure of the accumulator device, is provided, which is connected in each case to a control unit of the actuating device for transmitting its pressure measurement values.

15. The actuating device of claim 1, wherein a load-holding valve is provided which secures a suspension pressure in the consumer and can be controlled by a proportional pressure-reducing valve by means of a control fluid pressure or via an additional port of the actuating device or by the control unit.

16. A method for actuating at least one fluidically drivable consumer by means of the actuating device of claim 1, comprising:

charging the accumulator device to an initial accumulator pressure via the further valve device disposed in the charging position; and moving the valve piston of the further valve device into the suspension position, wherein the valve piston establishes a fluid path between the accumulator device and the consumer at least partially in a gradually increasing manner, wherein a suspension pressure in the consumer and a current accumulator pressure of the accumulator device simultaneously balance each other out via the fluid path and accordingly adjust to each other in a gradually increasing manner.

17. The method of claim 16, wherein the suspension pressure and the initial accumulator pressure are each detected using a pressure sensor and wherein, after the accumulator device has been charged to the initial accumulator pressure and before it is connected to the consumer, the initial accumulator pressure is adjusted to the suspension pressure as a function of the detected pressures by either discharging or charging the accumulator device.

18. The actuating device of claim 1, wherein the at least one fluidically drivable consumer is a hydraulic actuator.

19. The actuating device of claim 1, wherein the consumer is connected to the pressure supply port via the respective one valve device.

* * * * *